US012803632B2

(12) United States Patent
Farhadi et al.

(10) Patent No.: US 12,803,632 B2
(45) Date of Patent: Nov. 17, 2026

(54) HARDWARE-CONTEXT AWARE DATA TRANSMITTER FOR COMMUNICATION SIGNALS BASED ON MACHINE LEARNING

(71) Applicant: Telefonaktiebolaget LM Ericsson (publ), Stockholm (SE)

(72) Inventors: Hamed Farhadi, Stockholm (SE); Henrik Rydén, Stockholm (SE); Mårten Sundberg, Årsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 534 days.

(21) Appl. No.: 18/036,019

(22) PCT Filed: Nov. 13, 2020

(86) PCT No.: PCT/EP2020/082128
§ 371 (c)(1),
(2) Date: May 9, 2023

(87) PCT Pub. No.: WO2022/100855
PCT Pub. Date: May 19, 2022

(65) Prior Publication Data

US 2024/0022297 A1 Jan. 18, 2024

(51) Int. Cl.
*H04B 7/06* (2006.01)
*H04L 1/00* (2006.01)
*H04L 5/00* (2006.01)

(52) U.S. Cl.
CPC ......... *H04B 7/0619* (2013.01); *H04B 7/0617* (2013.01); *H04L 1/0003* (2013.01); *H04L 5/0051* (2013.01)

(58) Field of Classification Search
None
See application file for complete search history.

(56) References Cited

U.S. PATENT DOCUMENTS 10,749,594 B1 8/2020 O'Shea et al.
2012/0069927 A1* 3/2012 Oyman ................ H04L 1/0019 375/285
2017/0366209 A1 12/2017 Weissman et al.
2018/0092047 A1* 3/2018 Merlin ................ H04W 52/241
(Continued)

OTHER PUBLICATIONS

Tugba Erpek, Deep Learning for Wireless Communications (Year: 2020).*

(Continued)

*Primary Examiner* — Ayaz R Sheikh
*Assistant Examiner* — Christopher R Davis
(74) *Attorney, Agent, or Firm* — Sage Patent Group

(57) ABSTRACT

A computer implemented method in a transmitter for transmitting information carried by a signal over a channel to a receiver, wherein signal processing by the transmitter and by the receiver is degraded by one or more hardware impairments, the method comprising receiving feedback data indicating contextual information of the hardware impairments, selecting a signal format for use in generating the signal based on a mapping between the contextual information of the hardware impairments and a pre-determined set of signal formats, generating the signal based on the information and on the selected signal format, and transmitting the signal to the receiver.

20 Claims, 4 Drawing Sheets

(56) References Cited

U.S. PATENT DOCUMENTS

| | | | | |
|---|---|---|---|---|
| 2018/0287759 | A1 | 10/2018 | Kundargi et al. | |
| 2018/0367192 | A1 | 12/2018 | O'Shea et al. | |
| 2019/0215118 | A1 * | 7/2019 | Molés Cases | H04L 5/0051 |
| 2020/0229206 | A1 * | 7/2020 | Badic | G05D 1/225 |
| 2020/0304259 | A1 * | 9/2020 | Ihalainen | H04L 5/0051 |

OTHER PUBLICATIONS

Ulf Gustavsson, On the Impact of Hardware Impairments on Massive MIMO (Year: 2014).*

Wikipedia on Oscillator Phase Noise (Year: 2019).*

Vidit Saxena, Reinforcement Learning for Efficient and Tuning-Free Link Adaptation (Year: 2020).*

Author Unknown, "Technical Specification Group Radio Access Network; NR; Base Station (BS) conformance testing Part 2: Radiated conformance testing (Release 16)," Technical Specification 38.141-2, Version 16.2.0, Dec. 2019, 3GPP Organizational Partners, 292 pages.

Jarajreh, et al., "Artificial Neural Network Nonlinear Equalizer for Coherent Optical OFDM," IEEE Photonics Technology Letters, vol. 27, Issue 4, Feb. 15, 2015, pp. 387-390.

Liu, et al., "OLS-Based RBF Neural Network for Nonlinear and Linear Impairments Compensation in the CO-OFDM System," IEEE Photonics Journal, vol. 10, Issue 2, Apr. 2018, 9 pages.

International Search Report and Written Opinion for International Patent Application No. PCT/EP2020/082128, mailed Jul. 15, 2021, 15 pages.

* cited by examiner

HARDWARE-CONTEXT AWARE DATA TRANSMITTER FOR COMMUNICATION SIGNALS BASED ON MACHINE LEARNING

This application is a 35 U.S.C. § 371 national phase filing of International Application No. PCT/EP2020/082128, filed Nov. 13, 2020, the disclosure of which is incorporated herein by reference in its entirety.

TECHNICAL FIELD

The present disclosure relates to data transmitters for use in both wired and wireless communication networks as well as to corresponding data receivers. There are disclosed systems, methods, and devices for adapting transmission by a transmitter based on a current hardware impairment context.

BACKGROUND

Common to most communication systems, both wired and wireless, is that they will experience varying operating conditions over time and/or frequency and/or space. The performance of a data receiver in terms of, e.g., detection error, can be improved by adapting the communication system to the conditions in which it is currently operating, such as low vs high signal to noise ratio (SNR), additive vs multiplicative noise, and/or flat vs frequency selective fading conditions. Receivers that adapt received signal processing to current operating conditions are known. For instance, in the fourth generation (4G) and fifth generation (5G) communication systems defined by the third-generation partnership project (3GPP), there are reference signals sent out to enable, e.g., channel estimation, which signals can be used for receiver adaptation to current operating conditions.

Recently, machine learning approaches have been proposed to tackle the communication system adaptation problem. For example, the papers by M. A. Jarajreh et al., "Artificial neural network nonlinear equalizer for coherent optical OFDM," *IEEE Photon. Technol. Lett*., vol. 27, no. 4, pp. 387-390, Feb. 15, 2015, and L. Liu, M. Bi, S. Xiao, J. Fang, T. Huang, and W. Hu, "OLS-based RBF neural network for nonlinear and linear impairments compensation in the CO-OFDM system," *IEEE Photon. J.*, vol. 10, no. 2, April 2018, both discuss applications of machine learning for receiver optimization to account for varying receiver conditions.

However, despite of this work and other recent work in the technical field of communication system adaptation, there is a need for improved methods for transmitting data over a communication channel. One part of this problem stems from the fact that it is complicated to accurately represent the wide variety of different impairments which may impact a communication signal. This is especially true for hardware impairments which may give rise to a plethora of different distortions and performance impacts.

SUMMARY

It is an object of the present disclosure to provide methods, transmitters, receivers, and other devices for transmitting data which alleviate at least some of the drawbacks associated with known systems. This object is at least partly obtained by a computer implemented method in a transmitter for transmitting information carried by a signal over a channel to a receiver, wherein signal processing by the transmitter and/or by the receiver is degraded by one or more hardware impairments. The method comprises receiving feedback data indicating contextual information of the hardware impairments, selecting a signal format for use in generating the signal based on a mapping between the contextual information of the hardware impairments and a pre-determined set of signal formats, generating the signal based on the information and on the selected signal format, and transmitting the signal to the receiver.

By accounting for contextual information of hardware impairments when generating the signal to be transmitted, the detrimental effects of non-ideal hardware is at least partly mitigated, or at least accounted for, which is an advantage. The disclosed methods are possible to implement with reasonable computational complexity and signalling overhead, which is a further advantage.

According to aspects, selecting the signal format comprises selecting a modulation and coding scheme (MCS) from a pre-determined set of MCSs for use in generating the signal, based on a mapping between the contextual information of the hardware impairments and the set of MCSs. This way a suitable MCS for the current hardware impairment context and overall communication conditions can be selected in an efficient and robust manner. By adapting MCS in this manner, a more reliable and efficient communication system is obtained.

According to aspects, selecting the signal format comprises selecting a phase tracking reference signal (PTRS) allocation from a pre-determined set of PTRS allocations for use in generating the signal, based on a mapping between the contextual information of the hardware impairments and the set of PTRS allocations.

This way a suitable PTRS allocation for the current hardware impairments and overall communication conditions can be selected in an efficient and robust manner.

According to aspects, selecting the signal format comprises selecting an antenna beamforming configuration from a pre-determined set of antenna beamforming configurations for use in transmitting the signal, based on a mapping between the contextual information of the hardware impairments and the set of antenna beamforming configurations.

By accounting for hardware impairments when selecting beamforming configuration, both increased robustness and performance in terms of, e.g., spectral efficiency of the communication system can be obtained.

According to aspects, the method further comprises selecting a hardware configuration at the transmitter in dependence of the feedback data.

Thus, the actual hardware configuration is selected in dependence of the contextual information of the hardware impairments. This means that the communication system can adapt to changes in hardware context and thus improve communication conditions, which is an advantage. The hardware configuration may comprise any of a back-off level associated with a power amplifier (PA) of the transmitter, an oscillator circuit power consumption level associated with the transmitter, and/or an optimized signalling constellation.

According to aspects, the mapping between the contextual information of the hardware impairments and the pre-determined set of signal formats is represented by a look-up table (LUT) and/or by a pre-determined function. Both the LUT and the pre-determined function represents selection means of low implementational complexity, which is an advantage.

According to aspects, the mapping between the contextual information of the hardware impairments and the pre-determined set of signal formats is represented by a reinforcement learning, RL, structure. As will be described in more detail in the following, an RL structure is particularly suitable for this task.

According to aspects, the method comprises transmitting a request from the transmitter to the receiver for a context reporting capability of the receiver. This way the transmitter can obtain information about the reporting capabilities of the receiver, and thus adjust its operation accordingly, which is an advantage. This also means that the technique can be gradually introduced into a communication system comprising legacy receivers which are not implementing any of the techniques disclosed herein.

According to aspects, the method comprises selecting a plurality of signal formats in sequence and monitoring received feedback data indicating hardware impairment contextual information corresponding to the signal formats. This way the transmitter can probe or sample the current communication conditions to better establish the hardware context at the transmitter and/or at the receiver.

According to aspects, the feedback data comprises feedback validity information indicating a time window and/or a frequency range and/or a beamforming antenna configuration where the feedback data is assumed valid. It is appreciated that feedback data may become outdated over time, frequency and/or beamforming configuration as the conditions change. However, by adding validity information, problems associated with outdated information can be alleviated.

According to aspects, the method comprises extracting the contextual information from the feedback data based on a neural network (NN) decoder structure. As will be discussed in more detail in the following, an NN decoder structure is particularly suitable for extracting the contextual information from the feedback data, thereby improving overall performance and robustness of the communication system.

According to aspects, the method comprises sending a neural network encoder corresponding to the neural network decoder to the receiver, or sending a parameter such as an NN weight vector, which defines the neural network encoder, or at least a class of NN encoders, for encoding the contextual information into the feedback data at the receiver. This is an efficient way of making sure that the encoding is done properly at the receiver. The encoder can also be adapted for the current situation, which is an advantage. Similarly, the methods disclosed herein may also comprise receiving a neural network decoder from the receiver corresponding to a neural network encoder used at the receiver for encoding the contextual information into the feedback data.

The object is also obtained by a computer implemented method in a receiver for receiving information carried by a signal over a channel from a transmitter to the receiver, wherein signal processing by the transmitter and by the receiver is degraded by one or more hardware impairments. The method comprises

- configuring a contextual model in the receiver, wherein the contextual model is arranged to generate contextual information of the hardware impairments based on samples of the received signal,
- receiving the signal,
- generating contextual information by the contextual model applied to samples of the received signal,
- encoding the contextual information as feedback data, and
- transmitting the feedback data to the transmitter.

Again, by accounting for contextual information of hardware impairments when generating the signal to be transmitted, the detrimental effects of non-ideal hardware is at least partly mitigated, which is an advantage. This method performed at a receiver enables such adaptation at the transmitter. The disclosed methods are possible to implement with reasonable computational complexity and signalling overhead, which is a further advantage.

According to aspects, the method comprises receiving the contextual model from the transmitter. This ensures that the contextual model is up to date and known to the transmitter.

According to aspects, the method comprises loading the contextual model from a memory comprising a plurality of contextual models, where the contextual model to be loaded is selected based on a current operating scenario of the receiver. This increases the relevance of the used model, which provides a more accurate modelling of the hardware context.

According to aspects, the method comprises transmitting a context decoder to the transmitter corresponding to an encoder of the contextual model. This way it can be ensured that the encoder/decoder pair matches and is suitable for the current hardware context.

According to aspects, the contextual model is a parametric probabilistic model configured to generate contextual information of the hardware impairments based on samples of the received signal. Parametric probabilistic models and their associated advantages will be discussed in more detail below.

According to aspects, the contextual model is a neural network configured to generate the contextual information of the hardware impairments based on samples of the received signal. Neural networks are particularly suitable for these types of tasks, as will be discussed in more detail below.

According to aspects, the method comprises transmitting a message comprising a receiver capability in response to a capability request received from the transmitter. This way the receiver can communicate capabilities to the transmitter, thus allowing the transmitter to adapt its operations in dependence of the capabilities to further optimize operations at the transmitter side.

There are also disclosed herein wireless devices, network nodes, computer programs, and computer program products associated with the above-mentioned advantages.

BRIEF DESCRIPTION OF THE DRAWINGS

The present disclosure will now be described in more detail with reference to the appended drawings, where.

DETAILED DESCRIPTION

Figure 1:
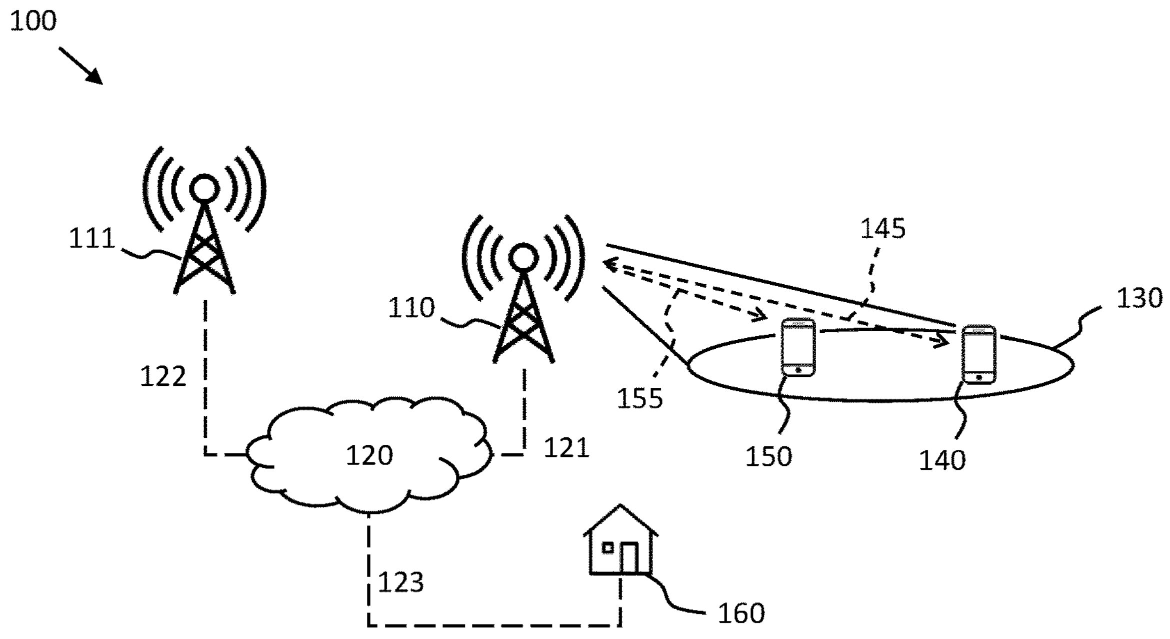
FIG. 1 shows example communication networks.

Aspects of the present disclosure will now be described more fully hereinafter with reference to the accompanying drawings. The different devices, systems, computer programs and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

FIG. 1 illustrates an example communication network 100 where access points 110, 111 provide wireless network access to wireless devices 140, 150 over a coverage area 130. An access point in a fourth generation (4G) 3GPP network is normally referred to as an evolved node B (eNodeB), while the access points in a fifth generation (5G) 3GPP network are often referred to as a next generation node Bs (gNodeB). The access points 110, 111 are connected to some type of core network 120, such as an evolved packet core network (EPC). The EPC is an example of a network which may comprise wired communication links, such as optical links 121, 122. Asymmetric digital subscriber line (ADSL) communication networks 123 constitute another example or a wired communications network. ADSL may, e.g., be used to connect stationary users 160 to the core network 120.

The wireless access network 100 supports at least one radio access technology (RAT) for communicating 145, 155 with wireless devices 140, 150. It is appreciated that the present disclosure is not limited to any particular type of wireless access network type or standard, nor any particular RAT. The techniques disclosed herein are, however, particularly suitable for use with 3GPP defined wireless access networks.

Radio communication 145, 155 takes place over a channel. A radio propagation channel comprises a physical transmission medium and normally introduces one or more forms of distortion to the transmitted information. Radio communication channels and the various degradations and impairments introduced to a radio waveform when propagating via a radio channel are generally known and will therefore not be discussed in more detail herein.

All communication links suffer from various impairments. Radio frequency (RF) wireless channel impairments are typically measured using distortion measures such as error-vector-magnitude (EVM). Furthermore, in the 3GPP specifications, there are also requirements for the largest values of EVM that can be tolerated, see for instance 3GPP TS 38.141-2 V16.2.0 (2019-12) for the required EVM values for different modulation schemes. Lower constellation orders, such as Quadrature Phase Shift Keying (QPSK) tolerate higher EVM impairment levels compared to higher order modulation schemes.

3GPP also places requirements on other kinds of impairment metrics such as for instance Adjacent Channel Leakage Ratio (ACLR) and Intermodulation Distortion (IMD) as specified in 3GPP TS 38.141-2 V16.2.0.

Figure 2:
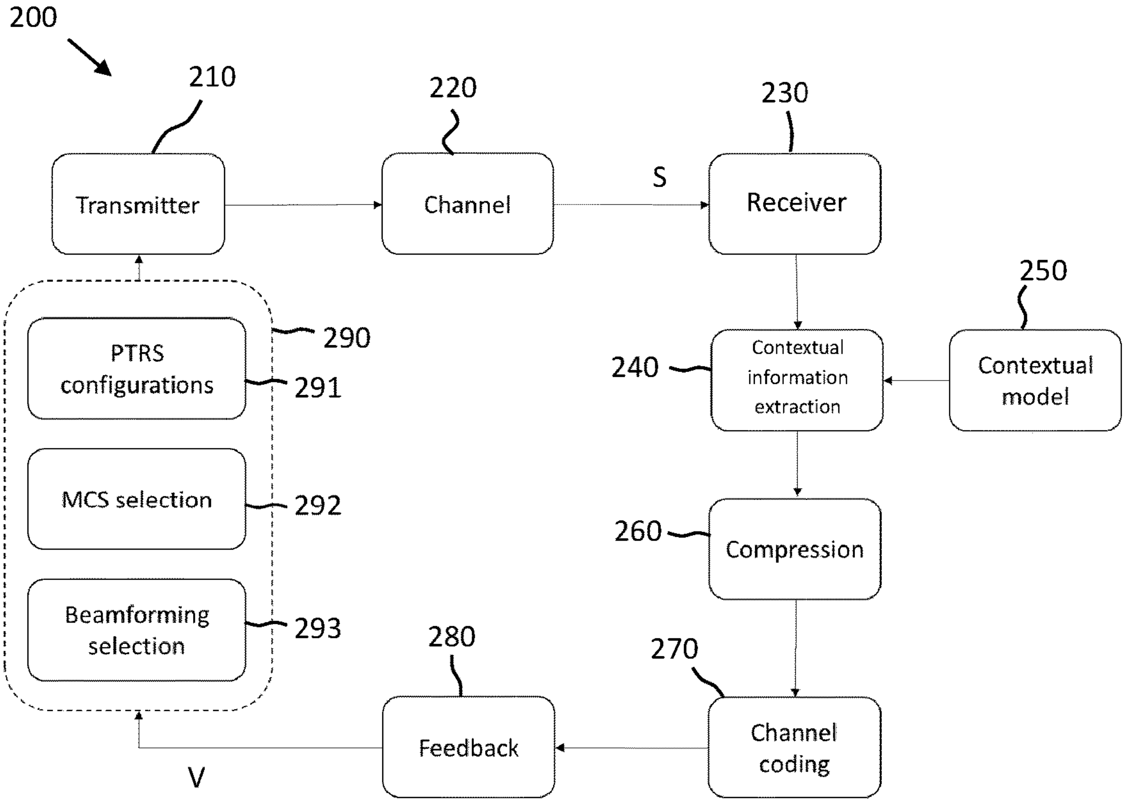
FIG. 2 schematically illustrates a communication system with feedback.

FIG. 2 illustrates a communication system 200 with feedback from a functional point of view. A transmitter 210 transmits information to a receiver 230, which information is carried by a signal S over a channel 220. The signal processing by the transmitter and/or by the receiver is degraded by one or more hardware impairments. Thus, the signal received at the receiver is distorted in some way due to the hardware impairments. To identify the context in which the communication system 200 is currently operating in, the receiver performs contextual information extraction 240 based on a contextual model 250. The output from this operation is contextual information I, which is indicative of the communication conditions, and in particular of the hardware impairments which are currently affecting the communication system. Different types of hardware impairments, such as phase noise and non-linear distortion, will be discussed below in more detail.

The contextual information may optionally be fed through a compression algorithm 260 in order to remove sub-optimal information overhead. A channel code 270 can also be applied in order to protect the information from error.

The compressed and coded contextual information is then sent back to the transmitter as feedback V, 280. This feedback can be used at the transmitter to adapt operations to the current operating conditions 290. Thus, by examining the contextual information received as feedback from the receiver, the transmitter is able to adjust, e.g., its antenna beamforming selection 293, select a suitable modulation and coding scheme (MCS), i.e. MCS selection 292, or configure a phase tracking reference signal (PTRS), i.e. PTRS configuration 291, comprised in the transmitted signal.

The present disclosure relates to a computer implemented method in a transmitter 110, 140, 150, 210 for transmitting information carried by a signal over a channel 145, 155, 220 to a receiver 230. The signal processing by the transmitter and by the receiver is degraded by one or more hardware impairments such as phase noise which distort the phase of the signal, non-linear distortion due to non-ideal amplifiers, and the like.

The proposed technique adapts transmit signals—e.g. by selecting the transport block coding and modulation index and/or PTRS signal configurations, by taking the contextual information about the hardware into account. In the proposed methods, the receiver 230 extracts the contextual information about the hardware quality using a model fitted to the measurements, referred to herein as a contextual model. The receiver feeds back the contextual information to the transmitter, and the transmitter is then able to select, e.g., MCS index and/or PTRS allocation using a look up table (LUT) indexed by the feedback information, or by some other pre-determined function of the feedback information V. The proposed link adaptation by the transmitter 210 exhibits a performance improvement compared to state-of-the-art link adaptation methods which normally do not take contextual information about hardware quality into account.

The proposed techniques assure that the selection of transmitter parameters matches the current communication link and hardware quality, and therefore avoids waste of communication resources in terms of required re-transmissions. The proposed techniques also provide an increased reliability to reach a desired probability of decoding error, and hence also improved throughput.

According to an example, the contextual information is used to select transmitter's parameters using for example a look up table or an analytical pre-determined function. The contextual information can, for instance, be a representation of both hardware quality and channel conditions, or just of hardware quality. It is appreciated that, in case the contextual information includes the channel conditions, the contextual information signalling from the receiver to the transmitter needs to be more frequent since the channel conditions normally changes more often than hardware impairments. In other words, the faster the context changes, the higher the feedback rate must be in order to not suffer a performance penalty.

Figure 3A:
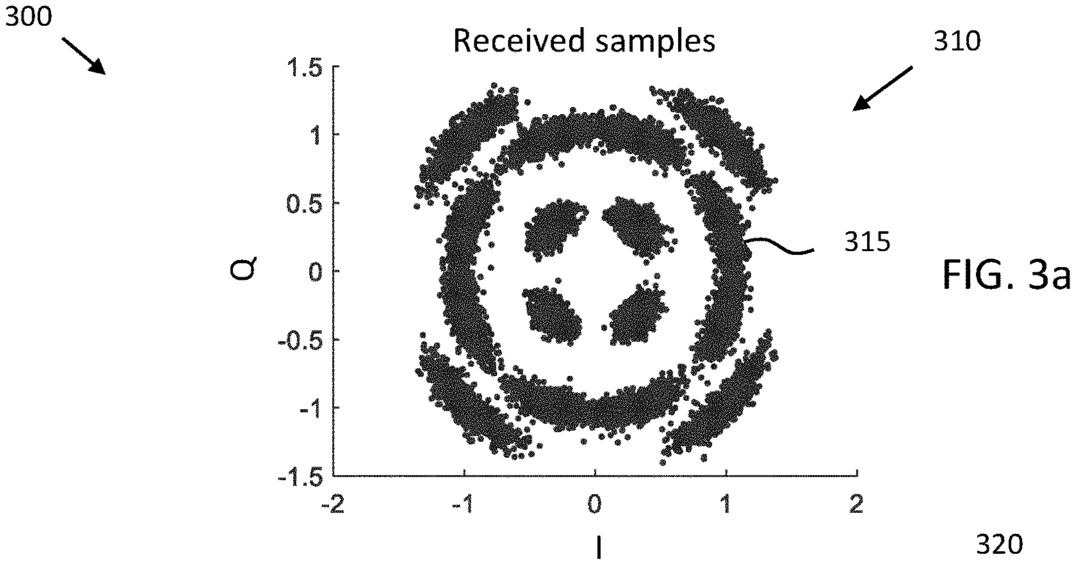
FIG. 3*a* show received samples of a communication signal.
Figure 3B:
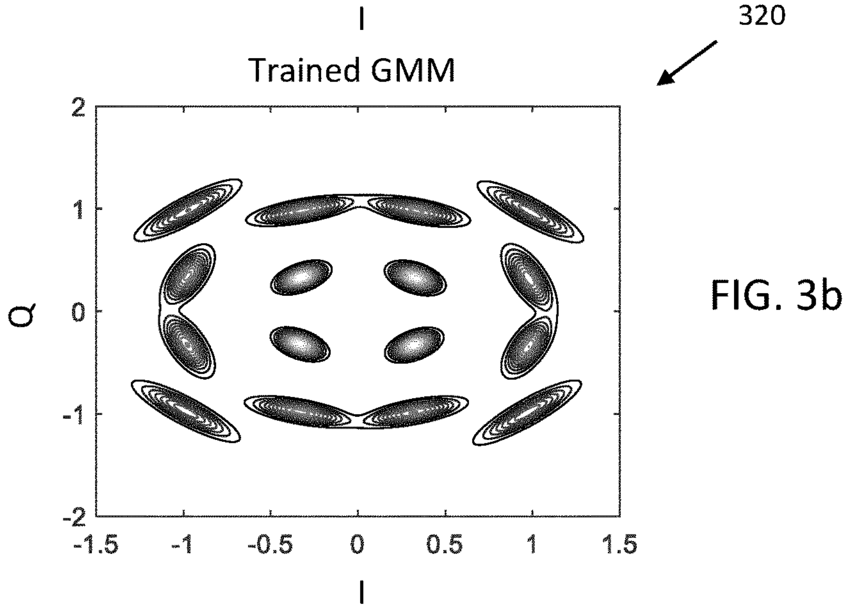
FIG. 3*b* is a visualization of different receiver contexts.

FIG. 3*a* shows an example 300 of a contextual model. The graph 310 of FIG. 3*a* is an in-phase/quadrature (I/Q) plot showing some example received samples 315 at the receiver 230. The received samples have been subject to a combination of additive noise and non-linear distortion, which is why the received samples are not focused on points in the I/Q plot but spread out in banana-shaped point clouds. A contextual model may, for instance, be a Gaussian Mixture Model (GMM), as shown in the graph 320 of FIG. 3*b*. A GMM is a statistical model for a distribution of a variable θ which is based on a sum of Gaussian distributions $\mathcal{N}$ $$p(\theta) = \sum_{i=1}^{K} \varphi_i \mathcal{N}(\mu_i, \Sigma_i)$$

By adapting the parameters of the GMM, i.e., K, $\varphi_i$, $\mu_i$, $\Sigma_i$ a context can be efficiently represented and fed back to the transmitter. The transmitter can then perform adaptation of the transmitted signal to better match the current context, such as changing MCS or adjusting the PTRS signaling. According to a particular example, the contextual information fed back to the transmitter as the feedback data V can be represented using a parametric probabilistic model, where the model parameters can be inferred from measured signals at the receiver. One example parametric probabilistic model is the GMM as illustrated in FIG. 3, and other certainly exist. The training of the model includes finding a priori probability, vector of mean values, and covariance matrix corresponding to each component. The model can be trained using an iterative algorithm such as expectation maximization to iteratively compute the likelihood that each sample is associated to each of the components for a given mean and covariance values, and to compute vector of mean values and covariance matrix for each component.

One particularly advantageous way to both represent contextual information and feed the contextual information back to the transmitter in an efficient manner is by an autoencoder (AE) network. Autoencoder networks are generally known, although they have, to be best of our knowledge, not been proposed for transmitter adaptation before.

Figure 4:
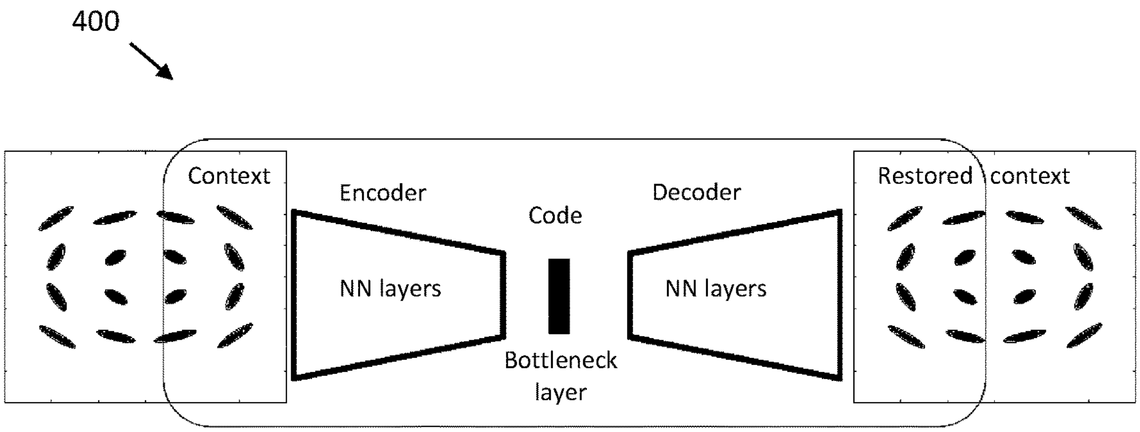
FIG. 4 schematically illustrates an autoencoder neural network.

An autoencoder 400, schematically illustrated in FIG. 4, is a type of machine learning algorithm that may be used to learn efficient data representations, that is to concentrate data. Autoencoders are trained to take a set of input features and reduce the dimensionality of the input features, with as small information loss as possible. An autoencoder is divided into two parts, an encoding part or encoder and a decoding part or decoder. The encoder and decoder may comprise, for example, deep neural networks (NNs) comprising layers (NN layers) of neurons. An encoder successfully encodes or compresses the data if the decoder is able to restore the original data stream with a tolerable loss of data.

An extension to autoencoders is the Variational autoencoder (VAE), VAE is an autoencoder where the encoded distribution is regularized during training, which will ensure that the latent space has properties that allows to generate new samples from the data distribution. The VAE has been shown to outperform classical methods in image compression and can also be used to generate new samples by sampling the latent space layer.

Figure 5:
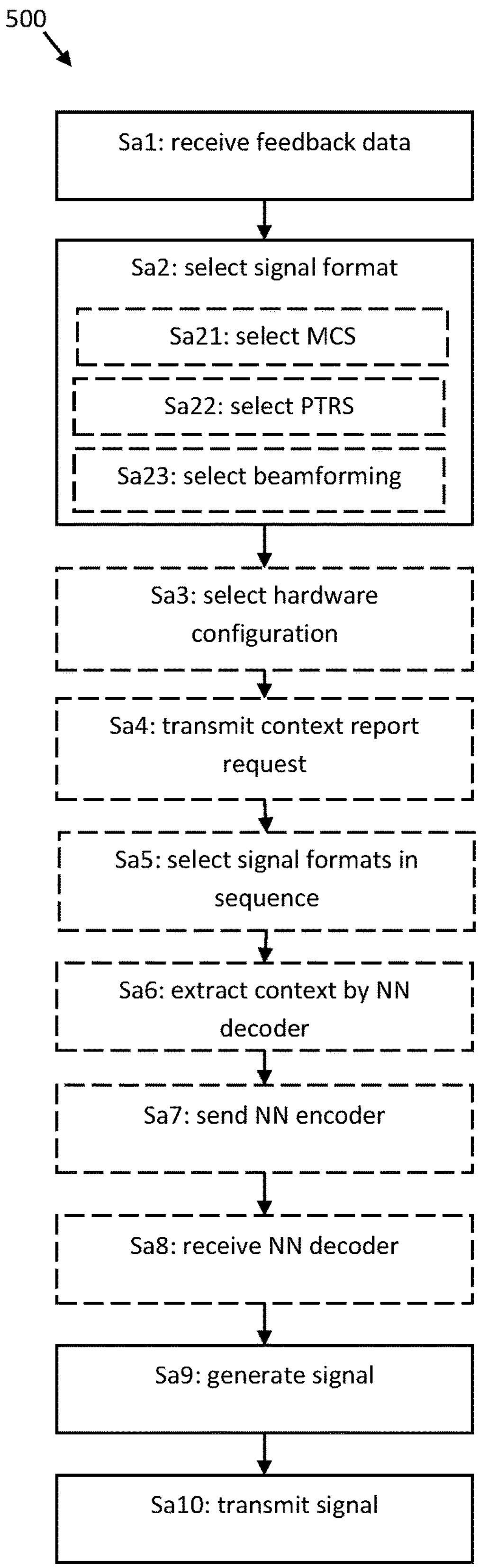
FIGS. 5-6 are flow charts illustrating methods in a transmitter and in a receiver, respectively.

FIG. 5 is a flowchart which summarizes some of the techniques disclosed herein applied on the transmitter side. FIG. 5 shows a computer implemented method 500 in a transmitter 110, 140, 150, 210 for transmitting information carried by a signal S over a channel 145, 155, 220 to a receiver 230, wherein signal processing by the transmitter and by the receiver is degraded by one or more hardware impairments. The method 500 comprises receiving Sa1 feedback data V indicating contextual information of the hardware impairments, selecting Sa2 a signal format for use in generating the signal based on a mapping between the contextual information of the hardware impairments and a pre-determined set of signal formats, generating Sa9 the signal S based on the information and on the selected signal format, and transmitting Sa10 the signal S to the receiver 230.

The transmitter may, as discussed above, adjust its operation in dependence of the received feedback data. The method may for instance comprise selecting Sa3 a hardware configuration at the transmitter 210 in dependence of the feedback data V. This hardware configuration may comprise a configurable back-off level associated with a power amplifier (PA) of the transmitter 210. By increasing this back-off level, non-linear distortion due to PA non-linearity often decreases, but at the expense of a reduced transmit power. The efficiency of the PA is also normally reduced when backing off, since most Pas have higher efficiencies when operated close to saturation. The hardware configuration may also comprise an oscillator circuit power consumption level associated with the transmitter 230. By increasing the allowable circuit power consumption level of the oscillator, phase noise can be reduced at the expense of a higher power consumption and more generated heat.

The hardware configuration may of course also comprise an optimized signalling constellation, potentially tailored to a GMM as exemplified in FIG. 3.

Generally, the mapping between the contextual information of the hardware impairments and the pre-determined set of signal formats is represented by a look-up table (LUT) and/or by some pre-determined function.

Figure 6:
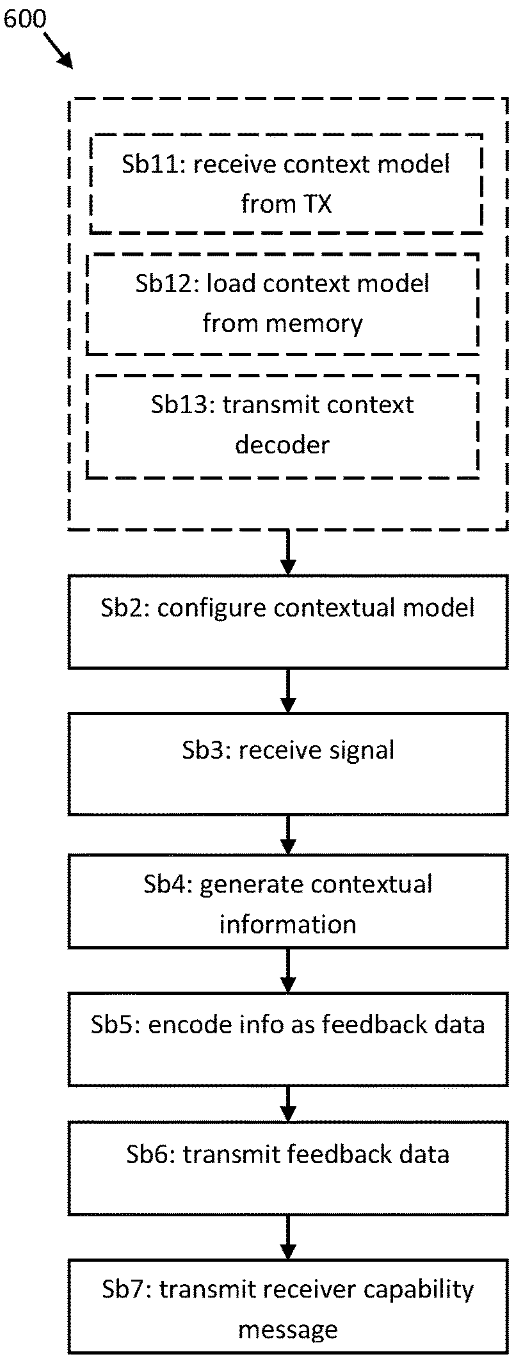
Figure 7:
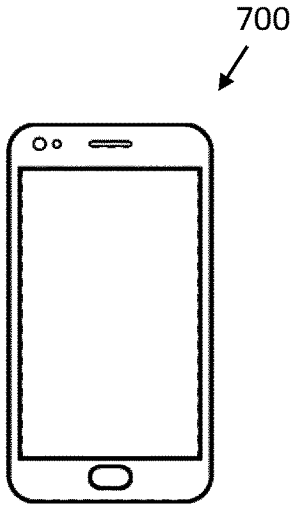
FIG. 7 shows an example wireless device.

FIG. 6 is a flowchart which summarizes corresponding methods implemented on the receiver side. Thus, FIG. 6 shows a computer implemented method 600 in a receiver 110, 140, 150, 230 for receiving information carried by a signal S over a channel 145, 155, 220 from a transmitter 210 to the receiver 230, wherein signal processing by the transmitter and by the receiver is degraded by one or more hardware impairments. The method comprises configuring Sb2 a contextual model 250 in the receiver 230, wherein the contextual model is arranged to generate contextual information I of the hardware impairments based on samples of the received signal, receiving Sb3 the signal, generating Sb4 contextual information by the contextual model applied to samples of the received signal, encoding Sb5 the contextual information as feedback data V, and transmitting Sb6 the feedback data V to the transmitter 210.

The method 600 optionally comprises receiving Sb11 the contextual model from the transmitter 210, or loading Sb12 the contextual model from a memory comprising a plurality of contextual models, where the contextual model to be loaded is selected based on a current operating scenario of the receiver 230, or transmitting Sb13 a context decoder to the transmitter corresponding to an encoder of the contextual model.

The contextual model can, e.g., be a parametric probabilistic model configured to generate contextual information of the hardware impairments based on samples of the received signal.

According to some aspects, the method comprises transmitting Sb7 a message comprising a receiver capability in response to a capability request received from the transmitter. The capability request can be included in e.g. a context report request. The receiver capability request can be either a separate message or be included in some other message transmitted by the transmitter.

The contextual model 250 shown in FIG. 2 may also comprise a neural network (NN) configured to generate the contextual information of the hardware impairments based on samples of the received signal. Thus, context can be represented using for example a convolutional neural network (CNN), where the model is trained based on measured data samples over a received I/Q plane. This type of model is then composed of certain number of weights which can be trained by minimizing a pre-determined cost function over training samples. The CNN can generate a representative vector for each received sample based on the trained model. One such network could be trained using an autoencoder network 400 as discussed above in connection to FIG. 4.

According to another example, as discussed above in connection to FIG. 2, the receiver finds a compressed version of the contextual information by removing redundancies and/or by applying compression algorithms to reduce the number of information bits to be transmitted. The user equipment (UE) can for example use an autoencoder to compress the contextual information, and the network side then restores the context based on the code received from the UE. The autoencoder could be trained by for example having UEs signaling their context (e.g. distribution). The autoencoder could also be trained using simulated data with channel models such as ITU typical urban, and receiver hardware impairment models.

The UE needs to receive the encoder in order to create the compressed contextual information, while the decoder is located in the network node. The encoder could be sent over the radio resource control channel (RRC) from the UE serving cell. The UE could also be preconfigured with an encoder. According to some aspects, the UE can be equipped with an encoder with a general configuration, e.g., trained on an aggregated dataset from multiple receiver hardware impairments models, and/or real hardware impairment data. The UE can also be configured with the decoder, this can enable the UE to estimate and feedback the reconstruction loss to the transmitter.

In another example, the UE can be configured, or receive multiple encoders. In this case, an entity needs to be implemented at the UE for identifying of the existing situation. The network could for example configure one encoder for a certain frequency range and/or channel condition (for example an environment with extensive multi-path propagation), In this case, UE needs to inform the network node about which encoder is used (e.g. by sending just the indices of the encoder). This can be included in the compressed contextual information report (as part of the feedback data V). The network node would then choose an appropriate decoder. In a related example, the UE can also be configured with the decoder, this can enable the UE to estimate the reconstruction loss and hence select the encoder with the lowest reconstruction loss. Or in case the uncertainty is high for all encoder/decoders, the UE can even signal the raw contextual information, or trigger an alarm procedure. This can enable the network to efficiently train the AE, by only receiving data when a new context has not been experienced before or has been experienced rarely.

The UE can also be configured with multiple encoders with different bottleneck layer size, and the network can select the best encoder based on the required context resolution.

The AE can also be trained by the UE. The UE then needs to signal its decoder network to the transmitter, and also update the transmitter with the encoding layer code when it changes. The network can in one embodiment configure the UE with the number of encoding nodes, limiting/setting the feedback size of the context.

According to some aspects, the UE trains a Variational AE to enable the transmitter to reconstruct the original distribution. In contrast to FIG. 200, when using an AE, the UE does not need to translate its received IQ samples to a distribution. This can enable the network to get more information on the underlying sample distribution of the UE. The UE needs to signal its decoder network and the noise distribution that the transmitter can use to reconstruct the receive UE sample distribution. The UE can also feedback other ML metrics for example the average Kullback-Leibler divergence and reconstruction loss of the training phase. Such VAEs can be trained as a common model over all the UEs in the system. Each UE can then maintain an updated latent state that reflects its UEs hardware impairments profile for its current situation.

According to some aspects, in the training phase, the UE stores a number of IQ-samples, and trains a VAE based on the samples. In the execution phase, the UE signals its z-distribution information and decoder to the transmitter. The transmitter then samples from the z-distribution information and feeds the samples (z) into the decoder to generate an expected received IQ-samples for the UE. The sampling method/distribution for z is typically a zero-mean Gaussian with unit variance. This could be indicated by the UE by signaling some flag (I/O) or preconfigured in the standards that the UE is using said z-distribution. If the UE signals a 0 flag, it needs to provide what z-distribution it uses.

According to yet another example, the transmitter indicates to the UE the distribution it should use, and also how to trade-off the KL-divergence and reconstruction loss, i.e. setting parameters of the optimization function.

Link adaptation is the process of determining the transport block modulation and coding scheme (MCS) based on channel quality to reach a certain decoding probability at the receiver. Link adaptation is an important component of both single-user (SU) multiple-input multiple-output (MIMO) and multi-user (MU) MIMO systems. For classic SU-MIMO, the user equipment (UE) reports back its present channel quality properties which is then typically directly applied by the evolved Node B (eNB) when selecting the MCS indices. In MU-MIMO, however, due to the possible interference from scheduled users, the channel quality at the receivers depends on the set of simultaneously scheduled users; therefore, the eNB may benefit from performing a more advanced MCS selection. Towards this end, the disclosed methods optionally comprises selecting Sa21 a modulation and coding scheme (MCS) from a pre-determined set of MCSs for use in generating the signal, based on a mapping between the contextual information of the hardware impairments and the set of MCSs. According to an example, the contextual information is used to select modulation and coding scheme index using a look up table or a pre-determined function. The contextual information can for example can be represented by a vector $$V=[\sigma_X^2,\sigma_Y^2,\rho],$$

where the elements are extracted from the received signal using machine learning techniques. A modulation scheme can be selected based on which representation vector out of a pre-determined set of vectors that is closest to the extracted contextual information using for example Euclidean distance.

A phase tracking reference signal (PTRS) has been introduced in the new radio (NR) radio access format. The PTRS is inserted in symbols for uplink transmission. These reference signals are used for phase estimation at receivers to be used for phase noise compensation. Different densities and group sizes are supported in NR for PTRS signals: 2/4/8 groups of 2/4 PTRS per group. The methods disclosed herein optionally comprise selecting Sa22 a PTRS allocation from a pre-determined set of PTRS allocations for use in generating the signal, based on a mapping between the contextual information of the hardware impairments and the set of PTRS allocations. In other words, the contextual information is used to allocate the amount of communication resources that are used for PTRS transmission, and hence, the adjusting the accuracy of phase noise estimation at the receiver side. For example, in NR 2, 4, or 8 groups PTRS can be transmitted in one OFDM symbol were each group can consist of 2 or 4 PTRS.

The contextual information can also be used to select the beamforming vectors that are used for multi-antenna transmission. For example, if the contextual information indicates that the hardware generates significant distortion, then a wide beam can be selected for transmission toward a specific receiver, while if the contextual information represents that the antenna hardware has high quality enabling accurate beamforming in terms of, e.g., direction, then a narrow beam with higher array gain can be selected for use in communicating with a given receiver. Thus, according to some aspects, the methods comprise selecting Sa23 an antenna beamforming configuration from a pre-determined set of antenna beamforming configurations for use in transmitting the signal, based on a mapping between the contextual information of the hardware impairments and the set of antenna beamforming configurations.

Machine learning algorithms refer to techniques that use a set of data for training models and the models are then used for various applications including inference, classification, and prediction. The machine learning algorithms can be classified into online and offline algorithms, where the offline algorithms are relying on pre trained models while the online algorithms can train the model on the fly while receiving new data samples. The mapping between the contextual information of the hardware impairments and the pre-determined set of signal formats for use by the transmitter can optionally be represented by a reinforcement learning (RL) structure. RL is a type of machine learning scheme where the algorithm continuously interacts with its environment and is given implicit and sometimes delayed feedback in the form of reward signals. Reinforcement learning performs short-term reward maximization but can also take short-time irrational decisions for long-term gains. Such algorithms try to maximize the expected future reward by exploiting already existing knowledge and exploring the space of actions in different network scenarios. The transmitter can use RL to find the optimal signal format selection for a certain contextual information feedback quantity, combined with additional information at the transmitter.

The input to the RL agent can comprise of the contextual information representing the hardware impairments from the receiver, channel quality information obtained from receiver, scheduling decisions from the network, for example what co-scheduled UEs are active in case of MU-MIMO operation. The action to be performed by the RL structure can, for instance, comprise MCS selection, antenna beamforming selection, and/or PTRS selection. The reward used in the RL structure can be based, e.g., on the UE service requirements, for example a combination of any of the following metrics throughput, latency, and reliability. According to one example, contextual information is inferred using a model. The model can be trained offline, or it can be trained online based on measurements over one or few time or frequency slots or part of a slot in an orthogonal frequency division multiplexed (OFDM) communication system such as 4G or 5G. The model can be trained using supervised methods by providing the list of measurements and corresponding labels or can be trained using unsupervised methods based on only the measurement data.

According to some aspects, the method comprises transmitting Sa4 a request from the transmitter 210 to the receiver 230 for a context reporting capability of the receiver 230. The transmitter can optionally request for the receiver capabilities in reporting a contextual information, where the context can represent the receiver hardware impairments. The receiver can transmit its capabilities using for example RRC signaling protocol in LTE/NR, the hardware impairments could for example be represented by the manufacture information available in RRC.

According to some other aspects, the method comprises selecting Sa5 a plurality of signal formats in sequence and monitoring received feedback data V indicating hardware impairment contextual information corresponding to the signal formats. This way, in order to enable the receiver to assess the contextual information, the transmitter can configure the receiver to receive OFDM symbols with each modulation (iterate over QPSK, 16QAM, etc.), or each PTRS configuration out of a pre-determined list of PTRS configurations. The receiver can then report a contextual information for each modulation, or a context which represents all modulations jointly.

The feedback data V optionally comprises feedback validity information indicating a time window and/or a frequency range and/or a beamforming antenna configuration where the feedback data is assumed valid. Thus, the contextual information, which is fed back can comprise a validity, comprising, e.g., the time window when the contextual information is valid, and optionally, for what frequency range the context is valid. A receiver may only have based the context on the sub-band where it is scheduled and might thus not be valid if requested to receive data in another sub-band. The receiver can also be configured to report periodic contextual information or be triggered to report contextual information when it has changed sufficiently.

The method may also comprise extracting Sa6 the contextual information from the feedback data V based on a neural network decoder structure, and also sending Sa1 a neural network encoder corresponding to the neural network decoder to the receiver 230 for encoding the contextual information into the feedback data V at the receiver 230. The method may also comprise receiving Sa8 a neural network decoder from the receiver 230 corresponding to a neural network encoder used at the receiver 230 for encoding the contextual information into the feedback data V.

Figure 9:
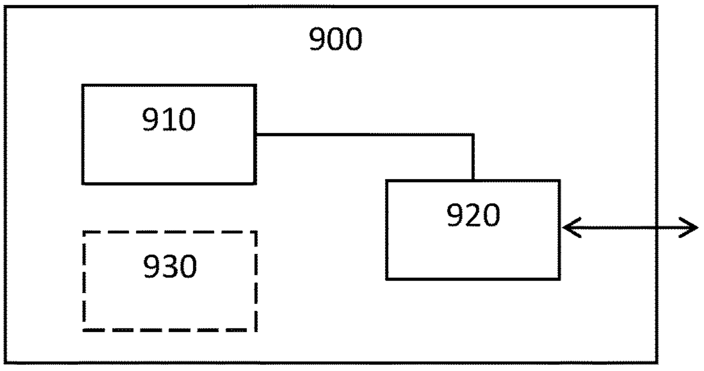
FIG. 9 schematically illustrates processing circuitry.

FIG. 9 schematically illustrates, in terms of a number of functional units, the general components 900 of a network node or a wireless device according to embodiments of the discussions herein. Processing circuitry 910 is provided using any combination of one or more of a suitable central processing unit CPU, multiprocessor, microcontroller, digital signal processor DSP, etc., capable of executing software instructions stored in a computer program product, e.g. in the form of a storage medium 930. The processing circuitry

910 may further be provided as at least one application specific integrated circuit ASIC, or field programmable gate array FPGA.

Particularly, the processing circuitry 910 is configured to cause the device 900 to perform a set of operations, or steps, such as the methods discussed in connection to FIG. 5 and FIG. 6 and the discussions above. For example, the storage medium 930 may store the set of operations, and the processing circuitry 910 may be configured to retrieve the set of operations from the storage medium 930 to cause the device to perform the set of operations. The set of operations may be provided as a set of executable instructions. Thus, the processing circuitry 910 is thereby arranged to execute methods as herein disclosed.

The device 900 may further comprise an interface 920 for communications with at least one external device. As such the interface 920 may comprise one or more transmitters and receivers, comprising analogue and digital components and a suitable number of ports for wireline or wireless communication.

The processing circuitry 910 controls the general operation of the device 900, e.g., by sending data and control signals to the interface 920 and the storage medium 930, by receiving data and reports from the interface 920, and by retrieving data and instructions from the storage medium 930. Other components, as well as the related functionality, of the control node are omitted in order not to obscure the concepts presented herein.

Figure 8:
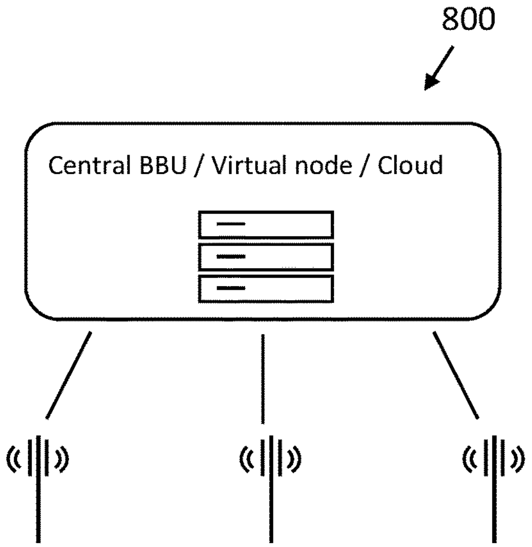
FIG. 8 schematically illustrates a communications network.

FIGS. 8 and 9 both show schematic examples of a network node 800,900, comprising processing circuitry 910, a network interface 920 coupled to the processing circuitry 910, and a memory 930 coupled to the processing circuitry 910, wherein the memory comprises machine readable computer program instructions that, when executed by the processing circuitry, causes the network node to:

receive feedback data V indicating contextual information of the hardware impairments, select a signal format for use in generating the signal based on a mapping between the contextual information of the hardware impairments and a pre-determined set of signal formats, generate the signal based on the information and on the selected signal format, and transmit the signal to the receiver 230.

FIGS. 8 and 9 also both show schematic examples of a wireless device 800, 900, comprising processing circuitry 910, a network interface 920 coupled to the processing circuitry 910, and a memory 930 coupled to the processing circuitry 910, wherein the memory comprises machine readable computer program instructions that, when executed by the processing circuitry, causes the network node to:

configure a contextual model 250 in the receiver 230, wherein the contextual model is arranged to generate contextual information of the hardware impairments based on samples of the received signal, receive the signal, generate contextual information by the contextual model applied to samples of the received signal, encode the contextual information as feedback data V, and transmit the feedback data V to the transmitter 210.

Figure 10:
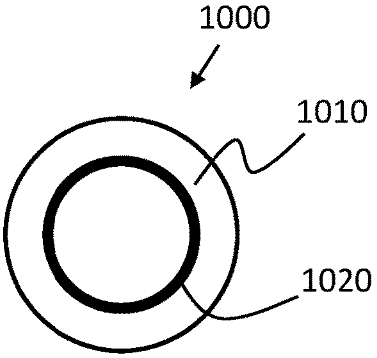
FIG. 10 shows a computer program product.

FIG. 10 illustrates a computer readable medium 1010 carrying a computer program comprising program code means 1020 for performing the methods illustrated in, e.g., FIG. 5 and FIG. 6, when said program product is run on a computer. The computer readable medium and the code means may together form a computer program product 1000.

The invention claimed is:

1. A computer implemented method in a transmitter for transmitting information carried by a signal over a channel to a receiver, wherein signal processing by the transmitter and/or by the receiver is degraded by one or more hardware impairments, the method comprising:

receiving feedback data indicating contextual information of the hardware impairments, the contextual information comprising measured and/or inferred hardware-impairment context associated with an operating condition of the transmitter and/or the receiver, selecting a signal format for use in generating the signal based on a mapping between the contextual information of the hardware impairments and a pre-determined set of signal formats of the contextual information of the hardware impairments, generating the signal based on the contextual information and on the selected signal format, and transmitting the signal to the receiver.

2. The method according to claim 1, wherein selecting the signal format comprises selecting a modulation and coding scheme (MCS) from a pre-determined set of MCSs for use in generating the signal, based on a mapping between the contextual information of the hardware impairments and the set of MCSs.

3. The method according to claim 1, wherein selecting the signal format comprises selecting a phase tracking reference signal (PTRS) allocation from a pre-determined set of PTRS allocations for use in generating the signal, based on a mapping between the contextual information of the hardware impairments and the set of PTRS allocations.

4. The method according to claim 1, wherein selecting the signal format comprises selecting an antenna beamforming configuration from a pre-determined set of antenna beamforming configurations for use in transmitting the signal, based on a mapping between the contextual information of the hardware impairments and the set of antenna beamforming configurations.

5. The method according to claim 1, further comprising selecting a hardware configuration at the transmitter in dependence of the feedback data.

6. The method according to claim 5, wherein the hardware configuration comprises a back-off level associated with a power amplifier (PA) of the transmitter.

7. The method according to claim 5, wherein the hardware configuration comprises an oscillator circuit power consumption level associated with the transmitter.

8. The method according to claim 5, wherein the hardware configuration comprises an optimized signalling constellation.

9. The method according to claim 1, wherein the mapping between the contextual information of the hardware impairments and the pre-determined set of signal formats is represented by a look-up table (LUT) and/or by a pre-determined function.

10. The method according to claim 1, wherein the mapping between the contextual information of the hardware impairments and the pre-determined set of signal formats is represented by a reinforcement learning (RL) structure.

11. The method according to claim 1, comprising transmitting a request from the transmitter to the receiver for a context reporting capability of the receiver.

12. The method according to claim 1, comprising selecting a plurality of signal formats in sequence and monitoring received feedback data indicating hardware impairment contextual information corresponding to the signal formats.

13. The method according to claim 1, wherein the feedback data comprises feedback validity information indicating a time window and/or a frequency range and/or a beamforming antenna configuration where the feedback data is assumed valid.

14. The method according to claim 1, comprising extracting the contextual information from the feedback data based on a neural network decoder structure.

15. The method according to claim 14, comprising sending a neural network encoder corresponding to the neural network decoder to the receiver, or sending a parameter which defines the neural network encoder, for encoding the contextual information into the feedback data at the receiver.

16. The method according to claim 14, comprising receiving a neural network decoder from the receiver corresponding to a neural network encoder used at the receiver for encoding the contextual information into the feedback data.

17. A network node, comprising:

processing circuitry;

a network interface coupled to the processing circuitry; and a memory coupled to the processing circuitry, wherein the memory comprises machine readable computer program instructions that, when executed by the processing circuitry, causes the network node to:

receive feedback data indicating contextual information of hardware impairments, the contextual information comprising measured and/or inferred hardware-impairment context associated with an operating condition of the transmitter and/or the receiver, select a signal format for use in generating the signal based on a mapping between the contextual information of the hardware impairments and a predetermined set of signal formats of the contextual information of the hardware impairments, generate the signal based on the information and on the selected signal format, and transmit the signal to the receiver.

18. A computer implemented method in a receiver for receiving information carried by a signal over a channel from a transmitter to the receiver, wherein signal processing by the transmitter and by the receiver is degraded by one or more hardware impairments, the method comprising:

configuring a contextual model in the receiver, wherein the contextual model is arranged to process samples of the received signal and generate contextual information of the hardware impairments based on the samples of the received signal, receiving the signal, generating contextual information by the contextual model applied to samples of the received signal, encoding the contextual information as feedback data, and transmitting the feedback data to the transmitter.

19. The method according to claim 18, comprising receiving the contextual model from the transmitter.

20. A wireless device, comprising:

processing circuitry;

a network interface coupled to the processing circuitry; and a memory coupled to the processing circuitry, wherein the memory comprises machine readable computer program instructions that, when executed by the processing circuitry, causes a network node to:

configure a contextual model in a receiver, wherein the contextual model is arranged to process samples of a signal and generate contextual information of the hardware impairments based on the samples of the signal, receive the signal, generate contextual information by the contextual model applied to samples of the received signal, encode the contextual information as feedback data, and transmit the feedback data to a transmitter.

* * * * *